May 8, 1962 J. L. CLARK 3,033,189
ROTATABLE BRAZIER
Filed Nov. 2, 1959 2 Sheets-Sheet 1
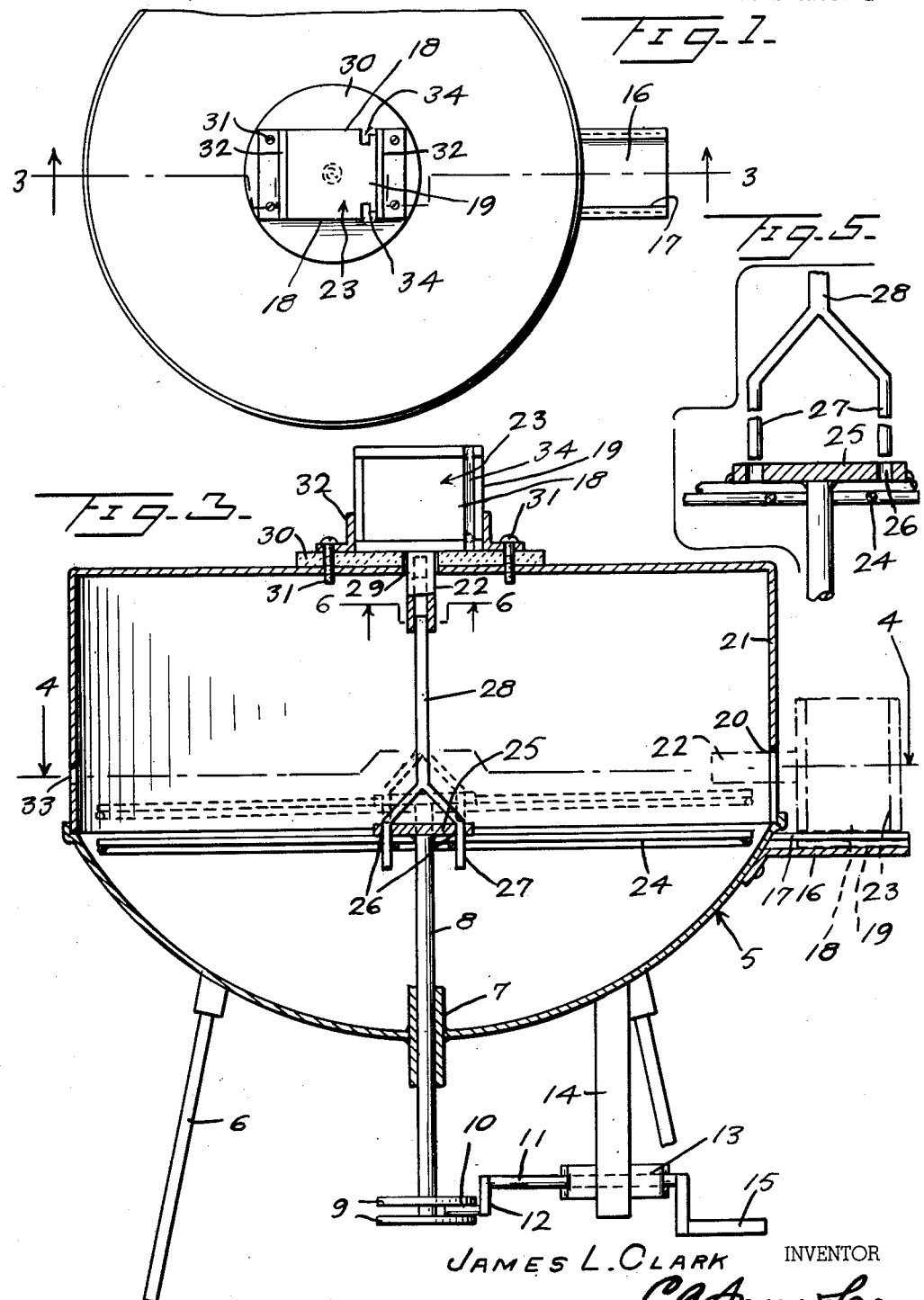
INVENTOR
JAMES L. CLARK
BY C.A.Snow&Co.
ATTORNEYS.

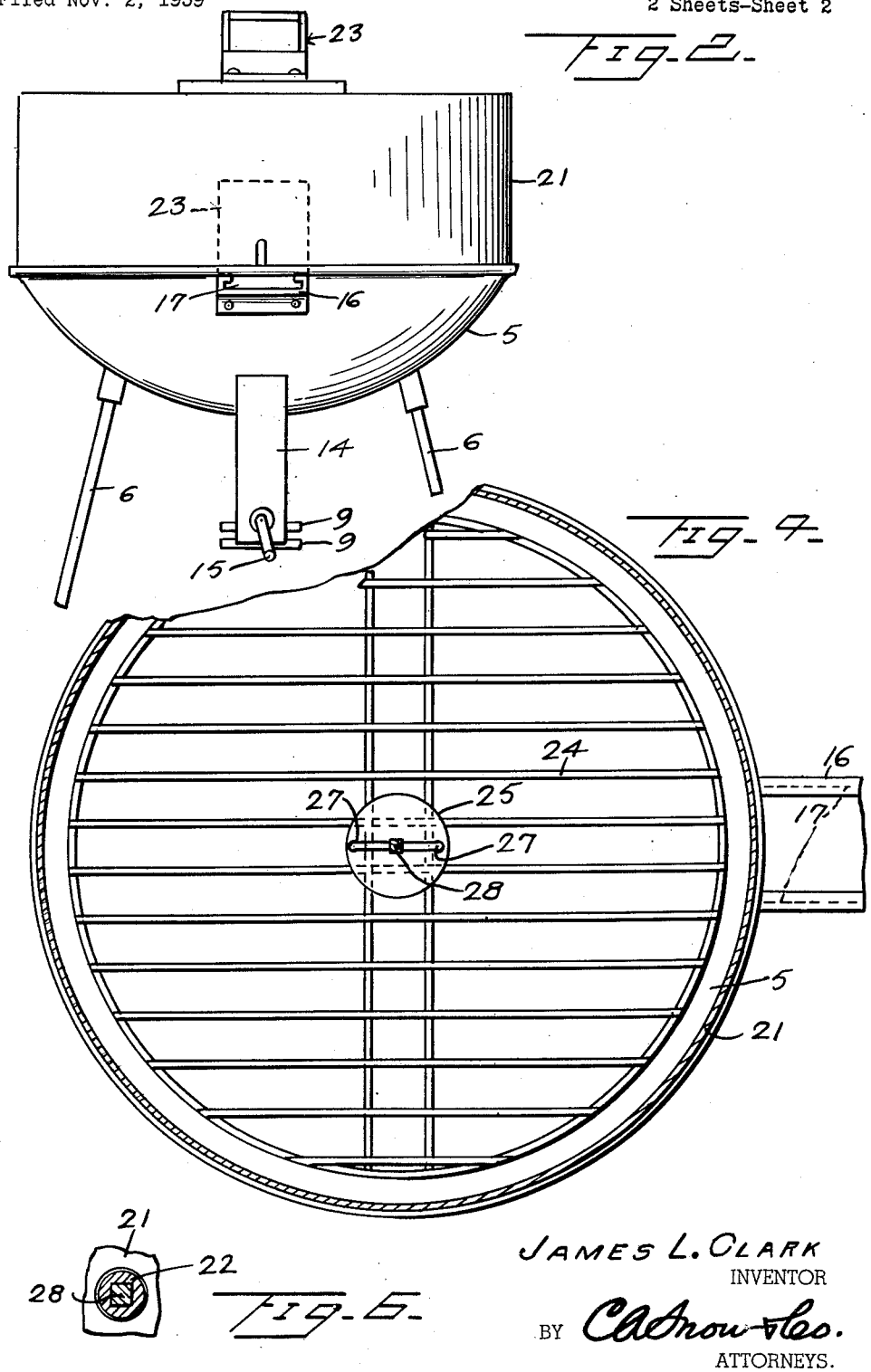

United States Patent Office 3,033,189
Patented May 8, 1962

3,033,189
ROTATABLE BRAZIER
James L. Clark, Rte. 2, Box 4065C, Sacramento, Calif.
Filed Nov. 2, 1959, Ser. No. 850,445
1 Claim. (Cl. 126—25)

This invention relates to a rotatable brazier construction, the primary object of the invention being to provide a brazier wherein the conventional motor and horizontal spit may be removed and the motor relocated to a position on the top of the brazier where the spit is replaced by a removable vertical shaft having means for connecting the shaft with the rotary grill of the brazier, operating the grill in a horizontal plane during the grilling of steaks, chops or the like, positioned thereon, so that grease drippings incident to the grilling operation will be distributed throughout the area of the burning coals of the brazier, thereby preventing the concentration of the drippings at a single point on the coal, which results in the burning and flaming of the grease, frequently causing charring of the food being cooked, resulting in an objectionable burnt flavor being imparted to the food.

Another object of the invention is to provide a brazier of this character wherein the auxiliary shaft used as a connection between the motor and rotary grill, may be positioned or removed by persons unfamiliar with mechanics and without the use of special tools.

Still another object of the invention is to provide an attachment between the motor and rotary grill for transmitting rotary movement to the grill in such a way that the vertical adjustment of the grill with respect to the burning fuel of the brazier, will not be impaired.

Another important object of the invention is to so mount the motor on the top or cover of the brazier, as to insure against heat or burning coals of the brazier damaging the windings of the motor.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawings:

FIGURE 1 is a plan view of a brazier illustrating the motor mounted on the top thereof.

FIGURE 2 is a side elevational view of the brazier.

FIG. 3 is a sectional view taken on line 3—3 of FIG. 1.

FIG. 4 is an enlarged sectional view, taken on line 4—4 of FIG. 3.

FIG. 5 is a fragmental elevational view partly in section illustrating the auxiliary vertical shaft as disconnected from the supporting plate.

FIG. 6 is a sectional view taken on line 6—6 of FIG. 3.

Referring to the drawings in detail, the brazier comprises a fire bowl indicated generally by the reference character 5, the fire bowl being provided with rigid legs 6, whereby the brazier is supported.

The reference character 7 indicates a tubular bearing disposed vertically and axially of the fire bowl, as better shown by FIG. 3 of the drawings, the tubular bearing 7 receiving the vertical shaft 8 that rotates therein. This shaft is provided with a pair of spaced discs 9 secured at the lower end thereof, the space between the discs 9 accommodating the horizontal end 10 of the elevating shaft 11, the horizontal shaft being offset by its attachment with the laterally extended section 12 of the shaft 11.

The shaft 11 is mounted in a bearing 13 which is supported by a bar 14 that descends from the bottom of the bowl 5, as clearly shown by FIG. 2 of the drawings. One end of the shaft 11 is formed into a crank handle 15, whereby operation of the crank handle 15 will result in vertical movement of the shaft 8, for purposes to be hereinafter more fully described. Supported on the outer surface of the bowl 5 adjacent to the upper edge thereof, is a bracket 16 which is provided with confronting ribs 17 that fit in grooves 34 formed in the side edges 18 of the motor base 19, so that the motor may be readily and easily slid into and out of position on the bracket 16.

An opening 20 is formed in the wall of the hood or cover 21, through which the tubular end 22 of the motor shaft extends, the tubular end 22 being designed to receive one end of a rotary spit (not shown). The rotary spit has a shaft square in cross section to fit within the correspondingly shaped interior of the tubular end 22. From this construction it will be seen that operation of the spit will be produced upon operation of the motor, which is indicated in dotted lines in FIG. 3 of the drawings, as mounted in the bracket 16, the motor being indicated by the reference character 23.

The grill which is indicated by the reference character 24 is of the conventional type and is mounted at the upper end of the shaft 8 through the medium of the supporting plate 25, which supporting plate is secured to the grill 24, as by welding.

Openings 26 are disposed in transverse spaced relation with respect to each other and are formed in the supporting plate 25, as clearly shown by FIG. 5 of the drawing, the openings being so arranged that they will receive the ends 27 of the forked end of the vertical shaft 28. The upper end of the shaft 28 is square in cross section and is designed to fit within the tubular end 22 of the motor shaft, when the motor 23 is mounted on the hood or cover 21, the tubular end of the motor shaft extending through the opening 29 in the hood or cover 21.

In order to protect the motor 23 against the heat from the burning coal used in the brazier, a circular block of Masonite is supported on the top of the cover or hood 21 and is formed with an opening to permit the tubular end 22 of the motor shaft to extend therethrough. The motor 23 is secured on the block of Masonite by means of the screw 31 and annular clamping bars 32 which are held in close contact with the side walls of the motor 23, as shown by FIG. 3 of the drawings. The bearing opening 33 is provided in the side wall of the hood or cover directly opposite to the opening 20 to receive one end of the spit, not shown, and which has one of its ends positioned in the tubular shaft 22 of the motor, when it is supported on the bracket 16.

When the brazier is to be used in cooking steaks, chops, or the like, the spit is removed and the motor relocated at the top of the hood or cover as shown in full lines in FIG. 3 of the drawings. With the motor in this position the shaft 28 is substituted for the spit and the free end of the shaft 28 is connected with the supporting plate 25 by extending the ends 27 through the openings 26. Thus it will be seen that due to this construction, the grill 24, of which the supporting plate 25 is a part, will be rotated in a horizontal plane, to the end that grease drippings will be distributed over the area of the burning coals in the fire bowl 5, thereby preventing the concentration of the drippings at a single point on the coals, which usually results in the burning of the grease causing the charring of the steaks or chops being cooked to cause an objectionable burnt flavor to be imparted to the food.

It will also be seen that with the structure shown, the crank handle 15 may be operated to adjust the horizontal position of the grill with respect to the burning coals in the fire bowl 5, so that the food being cooked may be subjected to the desired heat necessary for proper cooking.

It will also be noted that because of the structure shown and described, the brazier may be readily converted from a spit supported food cooking device, to a rotary grill for preventing the grease drippings being deposited at a single point on the burning coals, to cause a flame which would burn the food objectionably.

Having thus described the invention, what is claimed is:

In a brazier, a body comprising a fire bowl and removable cover, a rotary grill mounted within said body, a horizontal supporting plate having spaced openings forming a part of said grill, a motor having a hollow ended shaft, mounted on said cover, said hollow ended shaft presenting a socket square in cross section, extending through said cover in alignment with said supporting plate, a vertical shaft having a square end fitted in said hollow ended shaft of said motor and having a forked end extending into the openings of said supporting plate, connecting said vertical shaft with said motor and grill for rotating said grill, and manually controlled mechanism for adjusting said grill vertically with respect to said fire bowl.

References Cited in the file of this patent

UNITED STATES PATENTS

| | | |
|---|---|---|
| 1,018,116 | Kowalski | Feb. 20, 1912 |
| 1,895,230 | Needham | Jan. 24, 1933 |
| 2,819,667 | Victor | Jan. 14, 1958 |